United States Patent
Grip

(10) Patent No.: US 9,175,882 B2
(45) Date of Patent: Nov. 3, 2015

(54) SOLAR ENERGY SYSTEM WITH WIND VANE

(75) Inventor: Robert E. Grip, Rancho Palos Verdes, CA (US)

(73) Assignee: THE BOEING COMPANY, Chicago, IL (US)

(*) Notice: Subject to any disclaimer, the term of this patent is extended or adjusted under 35 U.S.C. 154(b) by 1096 days.

(21) Appl. No.: 12/726,593

(22) Filed: Mar. 18, 2010

(65) Prior Publication Data

US 2011/0226232 A1    Sep. 22, 2011

(51) Int. Cl.
*F24J 2/38* (2014.01)
*F24J 2/54* (2006.01)
*F24J 2/46* (2006.01)

(52) U.S. Cl.
CPC ............. *F24J 2/542* (2013.01); *F24J 2/4638* (2013.01); *Y02E 10/47* (2013.01)

(58) Field of Classification Search
USPC .......... 126/571–577, 600–609, 680; 136/246; 343/769, 766; 52/173.3
See application file for complete search history.

(56) References Cited

U.S. PATENT DOCUMENTS

| | | | |
|---|---|---|---|
| 2,947,989 A * | 8/1960 | Ford et al. .................... 343/757 |
| 4,108,154 A | 8/1978 | Nelson | |
| 4,204,214 A | 5/1980 | Fassnacht | |
| 4,274,394 A | 6/1981 | Stromberg | |
| 4,317,444 A * | 3/1982 | Maruko .................. 126/571 |
| 4,343,294 A | 8/1982 | Daniel | |
| 4,491,125 A | 1/1985 | Sainsbury | |
| 4,583,520 A | 4/1986 | Dietrich et al. | |
| 4,590,920 A | 5/1986 | Sainsbury | |
| 4,887,589 A * | 12/1989 | Frohardt et al. ............. 126/571 |
| 5,022,929 A | 6/1991 | Gallois-Montbrun | |
| 5,180,441 A | 1/1993 | Cornwall et al. | |
| 5,344,496 A | 9/1994 | Stern et al. | |
| 5,934,271 A | 8/1999 | Kaneff | |
| 7,793,654 B1 * | 9/2010 | Thorne ....................... 126/683 |
| 2003/0151505 A1 * | 8/2003 | Hayden ....................... 340/506 |
| 2005/0284468 A1 * | 12/2005 | Pawlenko et al. ............ 126/605 |
| 2008/0223443 A1 | 9/2008 | Benitez et al. | |
| 2008/0308152 A1 | 12/2008 | Grip | |
| 2009/0107542 A1 * | 4/2009 | Bender ....................... 136/246 |

FOREIGN PATENT DOCUMENTS

EP    2031323    3/2009

OTHER PUBLICATIONS

Plesniak, A. et al., "High Performance Concentrating Photovoltaic Module Designs for Utility Scale Power Generation," submitted for the PVSC34 Proceedings, Jun. 7-12, 2009, and SPIE Optics and Photonics, Aug. 2-6, 2009.

(Continued)

*Primary Examiner* — Avinash Savani
*Assistant Examiner* — Vivek Shirsat
(74) *Attorney, Agent, or Firm* — Diane Tsuda

(57) ABSTRACT

A solar energy system including a pedestal defining a longitudinal axis, a frame that is supported by the pedestal and that is rotateable relative to the pedestal about the longitudinal axis, the frame including at least one solar device, and a wind vane operatively connected to the frame to urge the frame relative to the pedestal about the longitudinal axis in response to wind acting on the wind vane.

13 Claims, 6 Drawing Sheets

(56) References Cited

OTHER PUBLICATIONS

Plesniak, A., Oral Presentation entitled "High Performance Concentrating Photovoltaic Module Designs for Utility Scale Power Generation," PVSC34 Proceedings, Jun. 7-12, 2009, and SPIE Optics and Photonics, Aug. 2-6, 2009.
Plesniak, A., Oral Presentation entitled "Demonstration of High Performance Concentrating Photovoltaic Module Designs for Utility Scale Power Generation," presented at ICEPAG 2009 (Feb. 10-12, 2009).
Plesniak, A., Poster panel entitled, "Demonstration of High Performance Concentrating Photovoltaic Module Designs for Utility Scale Power Generation," presented at ICSC5 (Nov. 16-19, 2008).
"Solar Thermal Propulsion (STP)," website of SRS Technologies, http:web.archive.org/web/20030122205006/http://www.stg.srs.com/atd/STP.htm (2 pages).
DeScioli, D., "Soliant Energy," Soliant Energy, Inc. (24 pages) (2007).
Web page of Soliant Energy, Inc., http://www.soliant-energy.com/products.php (2 pages).
"Products. Amonix 7700 Solar Power Generator," web page of Amonix, http://www.amonix.com/amonix_products.html (3 pages).
Horne, S. et al., "A Solid 500 Sun Compound Concentrator PV Design" (4 pages).
"Sunflower Technology," web page of Energy Innovations, Inc., http://www.energyinnovations.com/sunflower/technology.html (2 pages).
Product literature, "Sunflower. Fully-Integrated, Smart CPV," by Energy Innovations, Inc. (2 pages) (2008).
CN, Second Office Action and Search Report; Chinese Patent Application No. 201110070476.9 (Apr. 20, 2015).

* cited by examiner

10

SOLAR ENERGY SYSTEM WITH WIND VANE

STATEMENT REGARDING FEDERALLY SPONSORED RESEARCH

The inventions disclosed herein were made with the support of the government of the United States pursuant to contract number DE-FC36-07G017052 awarded by the Department of Energy. Therefore, the government of the United States may have certain rights in the disclosed inventions.

FIELD

This application relates to apparatus, systems and methods for minimizing loads acting on solar energy systems, particularly when such solar energy systems are in a stowed configuration.

BACKGROUND

Solar energy systems commonly include a frame that supports various photovoltaic cells, solar concentrators, reflectors, mirrors and/or lenses that are used to generate electrical energy from solar energy. For example, the frame may support an array of photovoltaic cells or an array of solar concentrator units. Therefore, solar energy systems typically include a solar tracker that maintains alignment between the frame and the sun as the sun moves across the sky.

Pedestal-mounted solar energy systems typically include a frame supported on a pedestal. Therefore, pedestal-mounted solar energy systems can sustain significant gravitational loads and wind loads as they track the sun. In an effort to minimize wind damage, pedestal-mounted solar energy systems are stowed in a horizontal configuration when wind speeds exceed a threshold value, such as 35 mph. Nonetheless, due to turbulence, wind rarely blows parallel with the ground. Therefore, even in the stowed configuration, pedestal-mounted solar energy systems are subject to significant bending moments, thereby requiring larger and more expensive tracker and support structures capable of withstanding wind loads.

Accordingly, those skilled in the art continue to seek new solar energy systems, including smaller and less expensive solar energy systems capable of withstanding wind and gravitational loads.

SUMMARY

In one aspect, the disclosed solar energy system may include a pedestal defining a longitudinal axis, a frame that is supported by the pedestal and that is rotateable relative to the pedestal about the longitudinal axis, the frame including at least one solar device, and a wind vane operatively connected to the frame to urge the frame relative to the pedestal about the longitudinal axis in response to wind acting on the wind vane.

In another aspect, the disclosed solar energy system may include a pedestal defining a longitudinal axis, a tracker assembly connected to the pedestal, the tracker assembly including an azimuth drive, a frame connected to the tracker assembly, the frame including at least one solar device, wherein the azimuth drive is configured to rotate the frame relative to the pedestal about the longitudinal axis, and a wind vane connected to at least one of the tracker assembly and the frame.

In another aspect, the disclosed solar energy system may include a pedestal defining a longitudinal axis, a tracker assembly connected to the pedestal, the tracker assembly including an azimuth drive and an elevation drive, a frame connected to the tracker assembly, the frame defining a first plane and including an array of solar devices, wherein the azimuth drive is configured to rotate the frame relative to the pedestal about the longitudinal axis, and a wind vane connected to the tracker assembly and/or the frame, the wind vane includes a major surface that defines a second plane, wherein the first plane is substantially perpendicular to the second plane.

In yet another aspect, disclosed is a method for reducing wind loads acting on a solar energy system. The method includes the steps of (1) providing a solar energy system that includes a pedestal defining a longitudinal axis and a frame that is supported by the pedestal and that is rotateable relative to the pedestal about the longitudinal axis, the frame supporting at least one solar device, and (2) connecting a wind vane to the frame (or an associated tracker assembly) to urge the frame relative to the pedestal about the longitudinal axis in response to wind acting on the wind vane.

Other aspects of the disclosed solar energy system with wind vane will become apparent from the following description, the accompanying drawings and the appended claims.

DETAILED DESCRIPTION

It has now been discovered that a solar energy system may be modified to include a wind vane such that, in the stowed configuration, the wind vane may advantageously orient the system with respect to the wind direction. In particular, a solar energy system may include a frame with an aspect ratio greater than 1 (i.e., the frame includes a short edge and a long edge) and the system may be modified to include a wind vane. In the stowed configuration, the wind vane may orient the frame such that the wind direction is perpendicular to the long edge and parallel with the short edge, thereby minimizing the bending moments acting on the frame.

Figure 1:
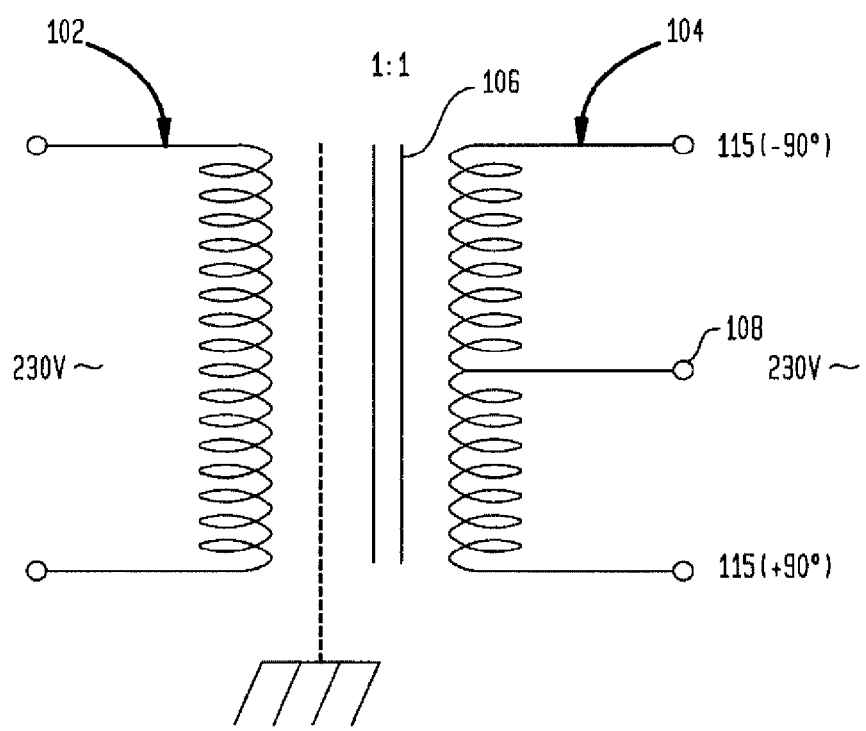
FIG. 1 is a side elevational view of a first aspect of the disclosed solar energy system with wind vane, shown in a tracking configuration.
Figure 2:
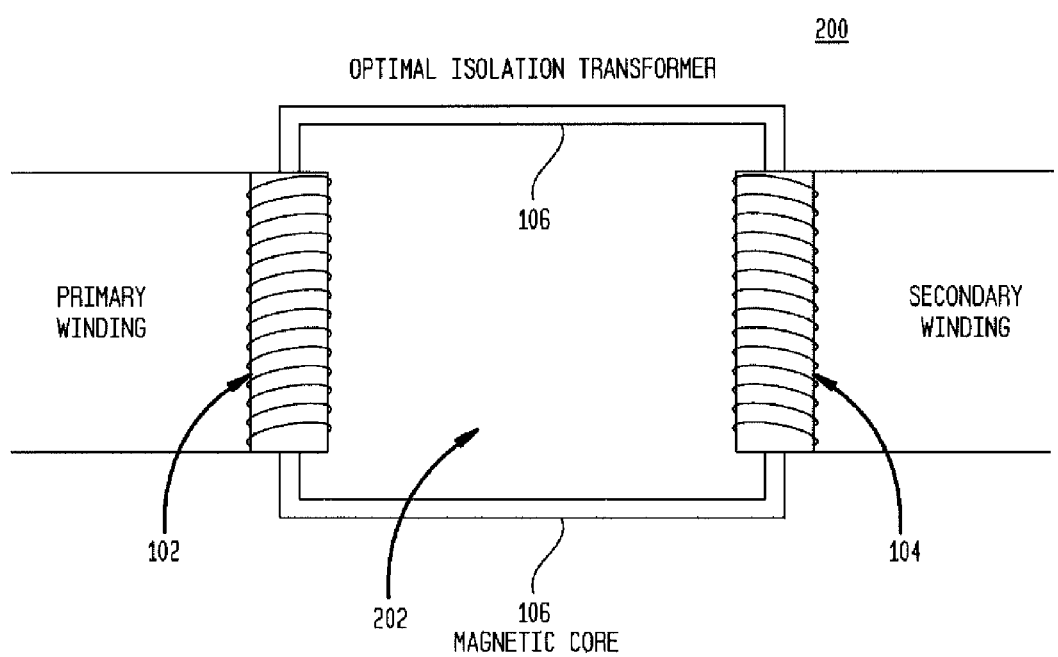
FIG. 2 is side elevational view of the solar energy system of FIG. 1, shown in a stowed configuration.

As shown in FIGS. 1 and 2, a first aspect of the disclosed solar energy system, generally designated 10, may include a pedestal 12, a tracker assembly 14, a frame 16 and a wind vane 18. Optionally, a controller (not shown), such as a computer, a microprocessor or like device, may be in communication with the tracker assembly 14 to control actuation of the tracker assembly 14 and, ultimately, the configuration of the frame 16.

The pedestal 12 may be an elongated, rigid structure, such as a hollow steel post, capable of supporting the mass of the tracker assembly 14 and the frame 16 in a windy outdoor environment. The pedestal 12 may define a longitudinal axis A, and may include a first end 20 and a second end 22. The first end 20 of the pedestal 12 may be connected to a support structure 24. For example, the pedestal 12 may be imbedded in the ground. The second end 22 of the pedestal 12 may be connected to the tracker assembly 14.

The tracker assembly 14 may be any apparatus or system capable of articulating the frame 16 relative to the pedestal 12 about at least one axis. For example, the tracker assembly 14 may be actuated to articulate the frame 16 relative to the pedestal 12 to maintain alignment between the frame and the sun as the sun moves across the sky.

In a first implementation of the first aspect, the tracker assembly 14 may be a two-axis tracker and may include an azimuth drive 26 and an elevation drive 28. The mounting surface (not shown) may provide structure for connecting the frame 16 to the tracker assembly 14. For example, the frame 16 may be connected to the mounting surface using fasteners, such as screws or bolts/nuts, or by welding. However, at this point, those skilled in the art will appreciate that various techniques and apparatus may be used to secure the frame 16 to the tracker assembly 14.

The azimuth drive 26 may facilitate rotation of the frame 16 relative to the pedestal 12 about the longitudinal axis A of the pedestal 12. Therefore, the azimuth drive 26 may provide the frame 16 with a certain degree (e.g., 180 degrees or 360 degrees) of rotation about the longitudinal axis A relative to the pedestal 12.

As an example, the azimuth drive 26 may include a slew drive that causes rotation about the longitudinal axis A. In one expression of the first implementation, the azimuth drive 26 may be capable of being disengaged (e.g., by way of a clutch or the like) to allow free rotation of the frame 16 relative to the pedestal 12 about the longitudinal axis A of the pedestal 12.

The elevation drive 28 may facilitate rotation of the frame 16 about a hinge point 32 to facilitate pivoting of the frame 16 relative to the longitudinal axis A of the pedestal 12. Therefore, the elevation drive 28 may control the angle B of the frame 16 relative to the longitudinal axis A of the pedestal 12. While FIG. 1 shows an angle B of 45 degrees and FIG. 2 shows an angle B of 90 degrees, those skilled in the art will appreciate that the elevation drive 28 may be constructed to achieve various angular configurations of the frame 16 relative to the longitudinal axis A of the pedestal 12.

As an example, the elevation drive 28 may include one or more actuators connected to the pedestal 12, wherein extension and contraction of the actuators controls the angle B of the frame 16 relative to the longitudinal axis A of the pedestal 12.

At this point, those skilled in the art will appreciate that the azimuth drive 26 and the elevation drive 28 of the tracker assembly 14 may be controlled to position the frame 16 in various configurations, including a stowed configuration. For example, as shown in FIG. 2, the azimuth drive 28 and the elevation drive 28 of the tracker assembly 14 may be capable of stowing the frame 16 in a horizontal configuration (i.e., angle B equals 90 degrees) to minimize wind loads.

The frame 16 may be any structure that includes at least one solar device 38, whether the solar device 38 is supported by the frame 16 or forms a part of the frame 16. For example, the frame 16 may be a solar array and may include an array 40 of solar devices 38. As used herein, "solar device," whether singular or plural, broadly refers to any apparatus or system used to collect or direct solar energy, particularly for the purpose of generating electrical energy, whether thermally, by photovoltaic process or otherwise. For example, the solar devices 38 may be, or may include, photovoltaic cells, solar concentrators, reflectors, mirrors, lenses and combinations thereof.

The frame 16 may be a generally planar frame that defines an outer peripheral edge 44 and optional upper 42 and lower 43 surfaces. In one particular implementation of the first aspect, the frame 16 may be a generally planar, rectangular frame, wherein the outer peripheral edge 44 includes two opposed long edges 46 and two opposed short edges 48.

The wind vane 18 may be a relatively thin, rigid, substantially planar structure having a major surface 50 with a relatively high surface area versus cross-sectional thickness. For example, the wind vane 18 may be stamped from a sheet of metal, such as aluminum. In a first implementation, the wind vane 18 may be connected to the underside 43 of the frame 16 such that at least one plane defined by the major surface 50 of the wind vane 18 is substantially parallel with the longitudinal axis A of the pedestal 12. In a second implementation, the wind vane 18 may be connected to the underside 43 of the frame 16 such that the major surface 50 of the wide vane 18 is substantially perpendicular to the frame 16 or at least one plane defined by the frame 16.

The surface area of the major surface 50 of the wind vane 18 may be dictated by the amount of force required to rotate the frame 16 relative to the pedestal 12, wherein a greater surface area will provide more rotational force while a smaller surface area will provide less rotational force. Specifically, the surface area of the major surface 50 of the wind vane 18 may be dictated by the amount of force required to overcome frictional forces, gravitational loads, aerodynamic moments and the like, and to allow the frame 16 to rotate about the longitudinal axis A relative to the pedestal 12. However, those skilled in the art will appreciate that the surface area of the wind vane 18 should not be so large that unnecessary forces are placed on the tracker assembly 14 during normal operation.

Referring to FIG. 2, the major surface 50 of the wind vane 18 may be positioned to orient the frame 16 as desired relative to the direction of the wind (arrow C). As an example, when the frame 16 is a typical 8 ft by 18 ft solar array, a bending moment of 60,000 in-lb is presented when the wind is parallel to the long edge (i.e., the 18 ft edge) and a bending moment of 30,000 in-lb is presented when the wind is parallel to the short edge (i.e., the 8 ft edge). Therefore, the wind vane 18 may be connected to the frame 16 to orient the frame 16 such that the wind (arrow C) is parallel with the short edges 48 of the frame 16 and perpendicular to the long edges 46 of the frame 16, thereby significantly reducing bending moments.

The shape of the wind vane 18 may be dictated by many factors. For example, the wind vane 18 may be shaped such that the center of gravity 52 of the wind vane 18 is positioned at a desired location to minimize bending moments by moving the center of gravity of the whole array 40 as close as possible to the hinge point 32. In other words, the wind vane 18 may also function as a counterweight. Optionally, an additional counterweight 54 may be connected to the frame 16 or the tracker assembly 14 to counter the weight of the wind vane 18.

In a first optional implementation of the first aspect, multiple wind vanes (not shown) may be used. For example, system 10 may be modified to include two or more wind vanes 18, wherein the wind vanes 18 are substantially parallel with each other.

In a second optional implementation of the first aspect, wind vane 18 may be connected to the frame 16 at a hinge (not shown) or the like, thereby allowing the wind vane 18 to selectively move from the deployed configuration shown in FIGS. 1 and 2 (i.e., perpendicular to the frame 16) to a stowed configuration (not shown) wherein the wind vane 18 is parallel with the frame 16 (e.g., folded against the frame 16).

Accordingly, the disclosed solar energy system 10 may be used to minimize wind loads. Specifically, the system 10 may operated in an ordinary fashion when wind speeds are below a threshold value. However, once wind speeds exceed the threshold value, the tracker assembly 14 may move the frame 16 to the stowed configuration (e.g., as shown in FIG. 2). In the stowed configuration or, optionally, prior to being in the stowed configuration, the azimuth drive 26 may be disengaged, thereby allowing the wind (arrow C in FIG. 2) acting on the wind vane 18 to advantageously orient the frame 16. Once oriented in the wind, the azimuth drive 26 may be reengaged, thereby fixing the position of the frame 16 relative to the wind. Alternatively, the azimuth drive 26 may remain disengaged, thereby allowing the frame 16 to oscillate in the wind.

Figure 3:
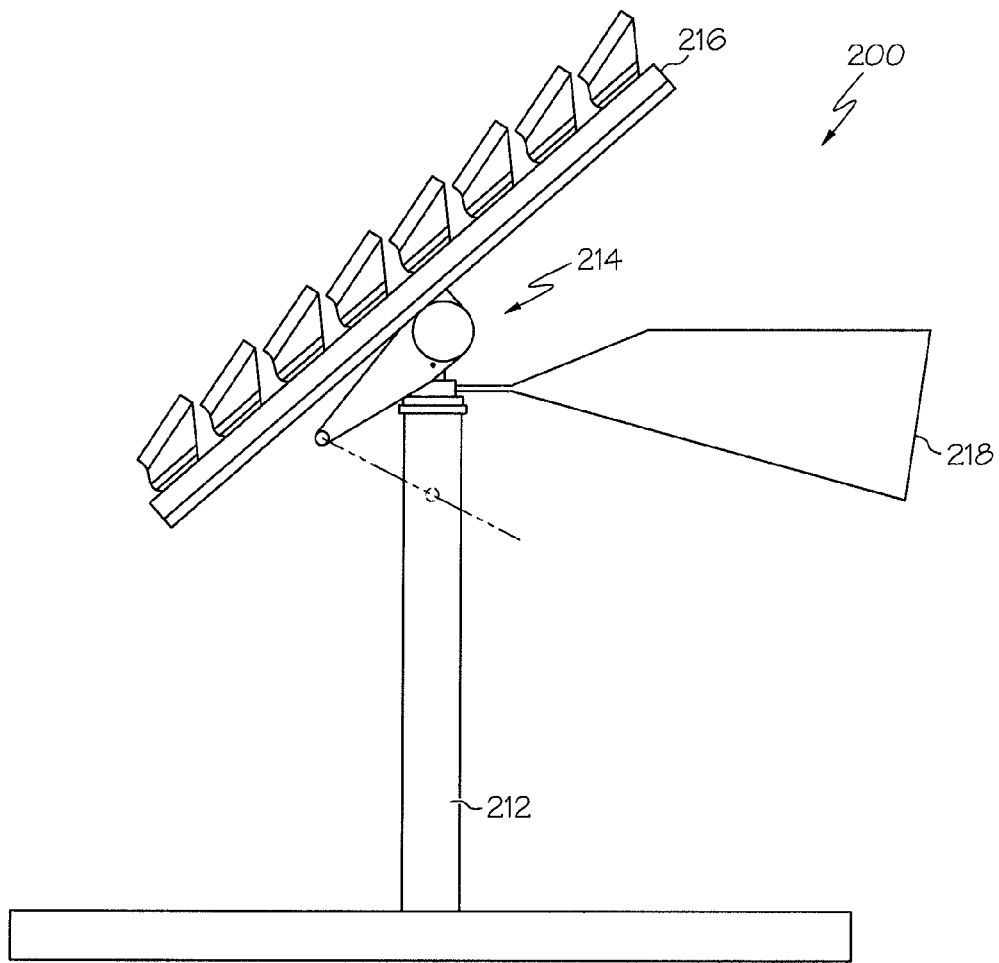
FIG. 3 is a side elevational view of a second aspect of the disclosed solar energy system with wind vane, shown in a tracking configuration.
Figure 4:
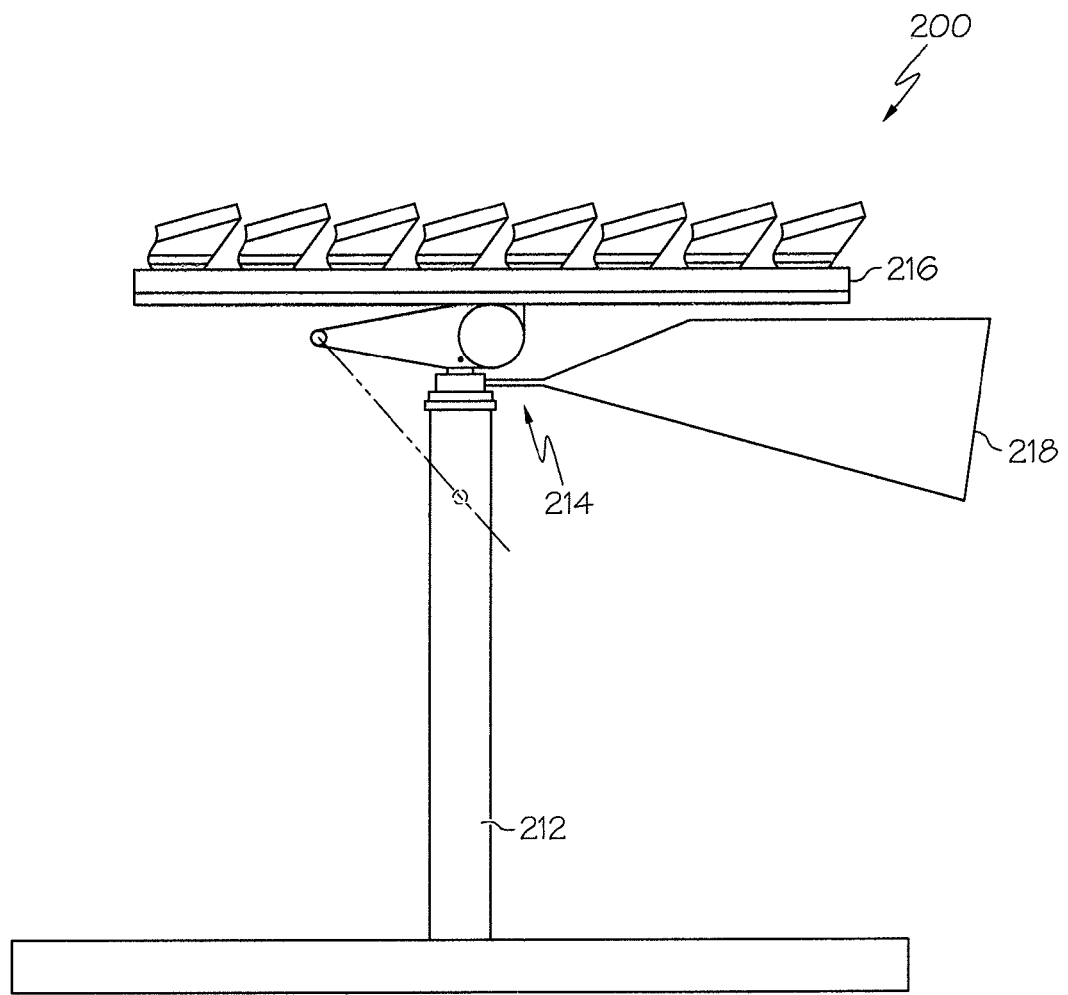
FIG. 4 is side elevational view of the solar energy system of FIG. 3, shown in a stowed configuration.

As shown in FIGS. 3 and 4, a second aspect of the disclosed solar energy system, generally designated 200, may include a pedestal 212, a tracker assembly 214, a frame 216 and a wind vane 218. Solar energy system 200 may be substantially the same as system 10. However, in system 200, the wind vane 218 may be connected to the tracker assembly 214 as opposed to the frame 216.

Figure 5:
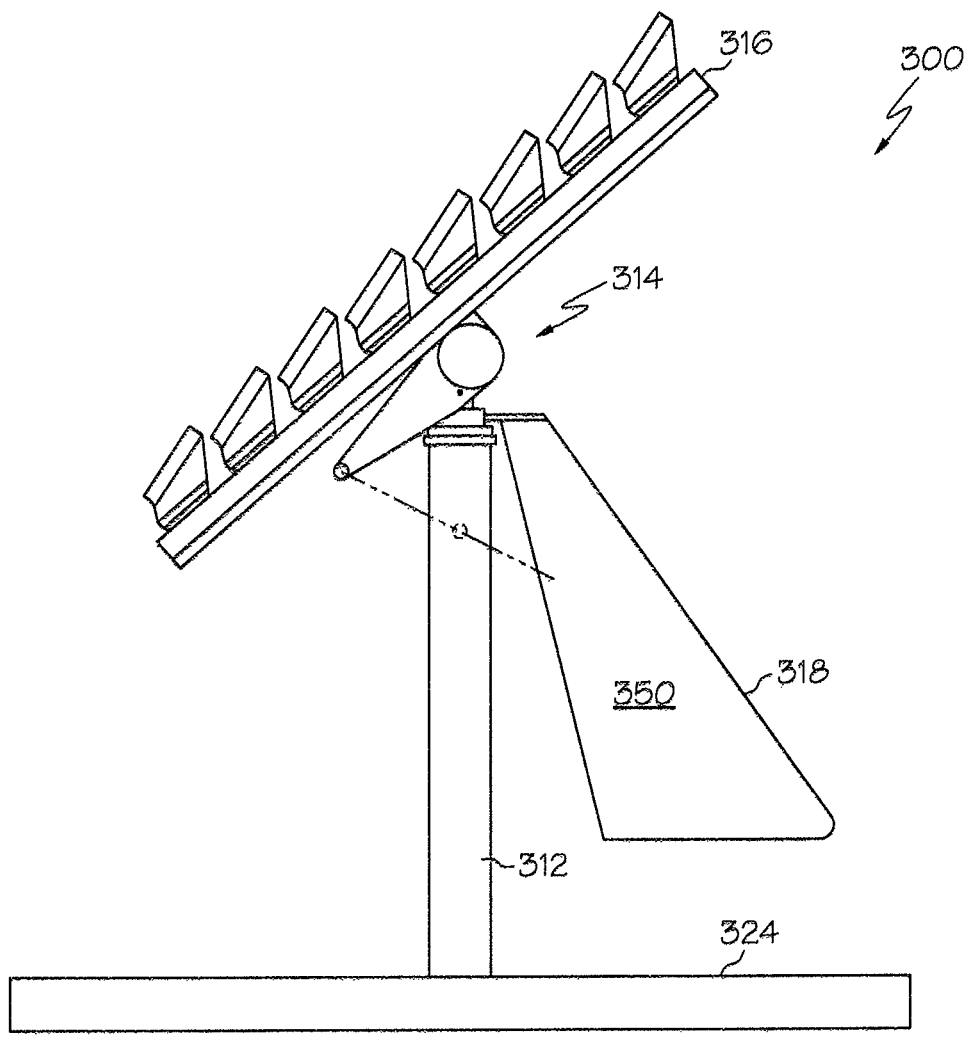
FIG. 5 is a side elevational view of a third aspect of the disclosed solar energy system with wind vane, shown in a tracking configuration.
Figure 6:
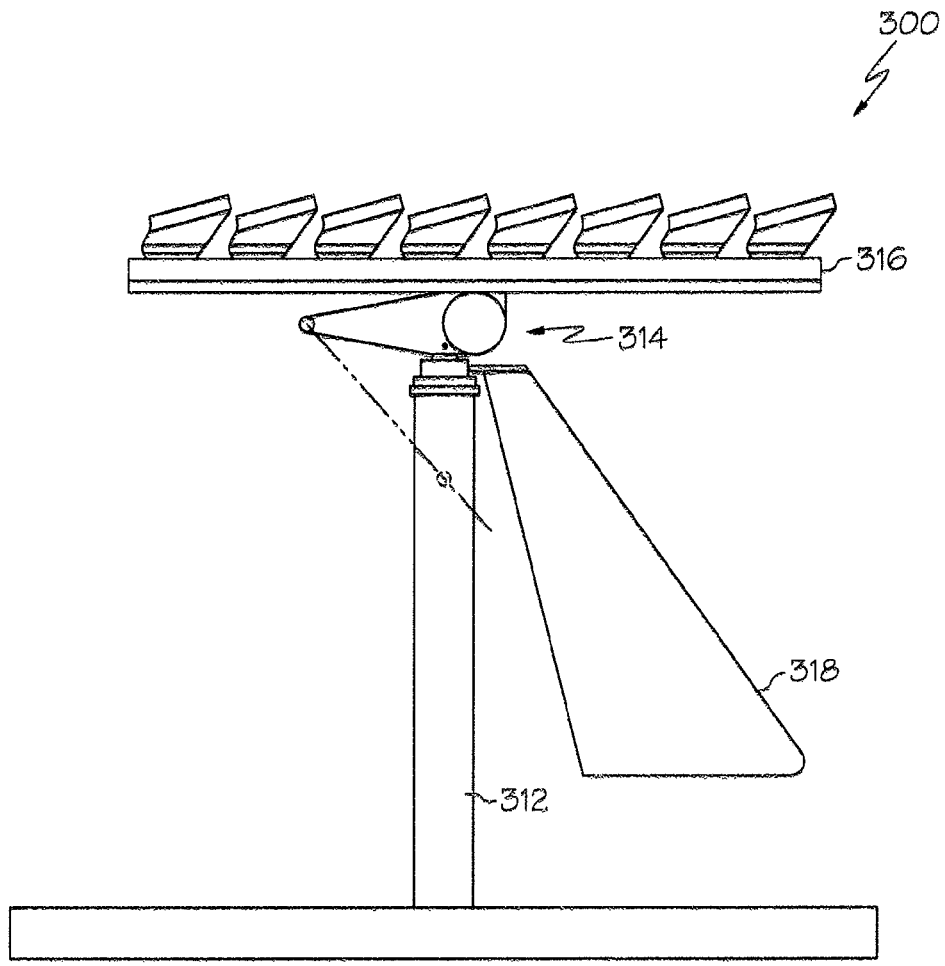
FIG. 6 is side elevational view of the solar energy system of FIG. 5, shown in a stowed configuration.

As shown in FIGS. 5 and 6, a third aspect of the disclosed solar energy system, generally designated 300, may include a pedestal 312, a tracker assembly 314, a frame 316 and a wind vane 318. Solar energy system 300 may be substantially the same as system 200. However, in system 300, the geometry of the wind vane 318 is such that a greater portion of the surface area of the major surface 350 of the wind vane 318 is closer to the support structure 324 (e.g., the ground) than the frame 316, thereby minimizing the possibility that the wind vane 318 could be shielded by the frame 316 in the un-stowed position.

Although various aspects of the disclosed solar energy system with wind vane have been shown and described, modifications may occur to those skilled in the art upon reading the specification. The present application includes such modifications and is limited only by the scope of the claims.

What is claimed is:

1. A solar energy system comprising:
    a support structure;
    a pedestal defining a longitudinal axis and having a first end and a second end, said first end of said pedestal connected to said support structure;
    a frame that is supported by said pedestal and that is rotatable relative to said pedestal about said longitudinal axis, said frame supporting at least one solar device;
    a tracker assembly connected to said second end of said pedestal and disposed between said pedestal and said frame, said tracker assembly including an elevation drive and an azimuth drive controlled to position said frame in a stowed position and a tracking position, said elevation drive including a hinge point located below said frame and along said longitudinal axis, said elevation drive facilitating rotation of said frame about said hinge point, and said azimuth drive facilitating rotation of said frame relative to said longitudinal axis and capable of being disengaged to allow free rotation of said frame relative to said pedestal about said longitudinal axis; and
    a wind vane including a major surface and operatively connected to said tracker assembly, said wind vane urging said frame to rotate relative to said pedestal about said longitudinal axis in response to wind acting on said wind vane when said azimuth drive is disengaged, and said elevation drive positioned to orient said frame such that said wind rotates said frame into said stowed position where said frame is oriented parallel with respect to a direction of said wind so as to reduce bending moments imposed by said frame on said pedestal in response to said wind, and a greater portion of a surface area of said major surface of said wind vane is positioned in a location closer to said support structure than said frame such that if said frame is positioned in said tracking position, said wind vane is substantially unshielded by said frame.

2. The solar energy system of claim 1, wherein said wind vane defines a first plane and said frame defines a second plane, and wherein said first plane is perpendicular to said second plane.

3. The solar energy system of claim 1, wherein said major surface defines a plane, and wherein said plane is parallel with said longitudinal axis.

4. The solar energy system of claim 1, wherein said wind vane is formed as a substantially flat and planar structure.

5. The solar energy system of claim 1, wherein said solar device includes at least one of a solar concentrator and a photovoltaic cell.

6. The solar energy system of claim 1, wherein said wind vane has a center of mass positioned to counterbalance said solar energy system.

7. A solar energy system comprising:
    a support structure;
    a pedestal defining a longitudinal axis and connected to said support structure;
    a frame including at least one solar device, said frame rotatable about said longitudinal axis;
    a tracker assembly disposed between said pedestal and said frame and configured to rotate said frame relative to said pedestal about said longitudinal axis, said tracker assembly including an azimuth drive and an elevation drive controlled to position said frame in a stowed position and a tracking position, said elevation drive including a hinge point located below said frame and along said longitudinal axis, said elevation drive facilitating rotation of said frame about said hinge point and said azimuth drive disengageable to allow free rotation of said frame relative to said pedestal;
    a wind vane including a major surface and operatively connected to said tracker assembly, said wind vane urging said frame to rotate relative to said pedestal about said longitudinal axis in response to wind acting on said wind vane when said azimuth drive is disengaged, and said elevation drive positioned to orient said frame such that said wind rotates said frame into said stowed position where said frame is oriented parallel with respect to a direction of said wind so as to reduce bending moments imposed by said frame on said pedestal in response to said wind, and a greater portion of a surface area of said major surface of said wind vane is positioned in a location closer to said support structure than said frame such that if said frame is positioned in said tracking position, said wind vane is substantially unshielded by said frame; and
    wherein said frame is generally planar and defines an outer peripheral edge including two opposed relatively long edges and two opposed relatively short edges; and wherein said wind vane is connected to said frame to orient said frame such that wind is parallel with said relatively short edges and perpendicular to said relatively long edges, thereby reducing bending moments.

8. The solar energy system of claim 7, wherein said frame includes an array of said solar devices.

9. The solar energy system of claim 7, wherein said solar device includes at least one of a solar concentrator and a photovoltaic cell.

10. The solar energy system of claim 7, wherein said major surface defines a plane, and wherein said plane is substantially perpendicular to said frame.

11. The solar energy system of claim 7, wherein said major surface defines a plane, and wherein said plane is substantially parallel with said longitudinal axis.

12. The solar energy system of claim 7, wherein said wind vane has a center of mass positioned to counterbalance said solar energy system.

13. The solar energy system of claim 1, wherein said frame is generally planar and defines an outer peripheral edge including two opposed relatively long edges and two opposed relatively short edges; and wherein said wind vane is connected to said frame to orient said frame such that wind is parallel with said relatively short edges and perpendicular to said relatively long edges, thereby reducing bending moments.

* * * * *